(12) United States Patent
Sato et al.

(10) Patent No.: US 8,829,438 B2
(45) Date of Patent: Sep. 9, 2014

(54) IMAGING APPARATUS AND IMAGING SYSTEM, METHOD THEREOF AND PROGRAM FOR THE SAME

(75) Inventors: Sho Sato, Kumagaya (JP); Tadao Endo, Honjo (JP); Toshio Kameshima, Kumagaya (JP); Masayoshi Akiyama, Yokohama (JP); Tomoyuki Yagi, Honjo (JP); Katsuro Takenaka, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/201,119

(22) PCT Filed: Mar. 30, 2010

(86) PCT No.: PCT/JP2010/056126
§ 371 (c)(1),
(2), (4) Date: Aug. 11, 2011

(87) PCT Pub. No.: WO2010/122894
PCT Pub. Date: Oct. 28, 2010

(65) Prior Publication Data
US 2011/0309262 A1    Dec. 22, 2011

(30) Foreign Application Priority Data
Apr. 20, 2009 (JP) ................................. 2009-102039

(51) Int. Cl.
*G01J 1/00* (2006.01)
(52) U.S. Cl.
USPC ...... 250/336.1; 250/393; 250/395; 250/208.1
(58) Field of Classification Search
USPC ............................ 250/393–395, 208.1, 336.1
See application file for complete search history.

(56) References Cited

U.S. PATENT DOCUMENTS

| | | | | |
|---|---|---|---|---|
| 5,949,811 A | * | 9/1999 | Baba et al. | 378/108 |
| 6,163,386 A | * | 12/2000 | Kobayashi et al. | 358/482 |
| 6,690,493 B1 | * | 2/2004 | Kobayashi et al. | 358/482 |
| 6,952,464 B2 | | 10/2005 | Endo | 378/98.11 |

(Continued)

FOREIGN PATENT DOCUMENTS

| | | |
|---|---|---|
| CN | 101234025 A | 8/2008 |
| CN | 101317104 A | 12/2008 |

(Continued)

OTHER PUBLICATIONS

Office Action issued May 14, 2013 in counterpart Japanese Patent Application 2009-102039.

*Primary Examiner* — David Porta
*Assistant Examiner* — Taeho Jo
(74) *Attorney, Agent, or Firm* — Fitzpatrick, Cella, Harper & Scinto

(57) ABSTRACT

An imaging operation includes a first imaging operation for outputting image data according to irradiation to the detector with radiation or light in an irradiation field A corresponding to a part of the plurality of pixels, and a second imaging operation for outputting image data according to irradiation to the detector 104 with radiation or light in an irradiation field B wider than the irradiation field A, wherein, responsive to a changing from irradiation in the irradiation field A to irradiation in the irradiation field B, an operation of the detector is controlled so that the detector performs an initializing operation for initializing conversion elements during a period between the first and second imaging operations.

10 Claims, 11 Drawing Sheets

(56) References Cited

U.S. PATENT DOCUMENTS

| | | | |
|---|---|---|---|
| 6,961,088 B2* | 11/2005 | Kameshima et al. | 348/303 |
| 7,042,980 B2* | 5/2006 | Endo | 378/98.8 |
| 7,081,629 B2* | 7/2006 | Endo | 250/370.11 |
| 7,109,492 B2* | 9/2006 | Endo | 250/370.09 |
| 7,227,926 B2 | 6/2007 | Kameshima et al. | 378/98.9 |
| 7,342,221 B2 | 3/2008 | Takenaka et al. | 250/252.1 |
| 7,381,963 B2 | 6/2008 | Endo et al. | 250/370.09 |
| 7,382,859 B2* | 6/2008 | Nokita et al. | 378/98.8 |
| 7,386,089 B2 | 6/2008 | Endo et al. | 378/5 |
| 7,403,594 B2 | 7/2008 | Endo et al. | 378/114 |
| 7,408,167 B2 | 8/2008 | Kameshima et al. | 250/370.09 |
| 7,421,063 B2 | 9/2008 | Takenaka et al. | 378/116 |
| 7,442,939 B2 | 10/2008 | Yagi et al. | 250/370.11 |
| 7,491,960 B2 | 2/2009 | Takenaka et al. | 250/580 |
| 7,499,091 B2* | 3/2009 | Abe et al. | 348/308 |
| 7,505,070 B2* | 3/2009 | Kameshima et al. | 348/302 |
| 7,514,663 B2 | 4/2009 | Yagi et al. | 250/208.1 |
| 7,514,690 B2 | 4/2009 | Endo et al. | 250/370.14 |
| 7,532,706 B2 | 5/2009 | Kameshima et al. | 378/98 |
| 7,541,591 B2 | 6/2009 | Endo et al. | 250/369 |
| 7,573,038 B2 | 8/2009 | Yokoyama et al. | 250/370.09 |
| 7,645,995 B2 | 1/2010 | Yagi et al. | 250/370.09 |
| 7,696,484 B2 | 4/2010 | Yokoyama et al. | 250/370.09 |
| 7,718,973 B2 | 5/2010 | Endo et al. | 250/370.08 |
| 7,724,874 B2 | 5/2010 | Kameshima et al. | 378/98.12 |
| 7,732,776 B2 | 6/2010 | Takenaka et al. | 250/369 |
| 7,839,977 B2* | 11/2010 | Kameshima et al. | 378/116 |
| 7,965,817 B2* | 6/2011 | Kameshima et al. | 378/98.8 |
| 8,072,514 B2 | 12/2011 | Takenaka et al. | 348/246 |
| 2004/0027472 A1* | 2/2004 | Endo et al. | 348/308 |
| 2005/0058252 A1* | 3/2005 | Yamada | 378/114 |
| 2005/0169428 A1* | 8/2005 | Hardesty | 378/110 |
| 2005/0264665 A1 | 12/2005 | Endo et al. | 348/308 |
| 2006/0182219 A1* | 8/2006 | Levy | 378/62 |
| 2006/0243910 A1* | 11/2006 | Nonaka | 250/336.1 |
| 2007/0096032 A1* | 5/2007 | Yagi et al. | 250/370.11 |
| 2009/0066475 A1* | 3/2009 | Takenaka et al. | 340/3.2 |
| 2009/0272909 A1 | 11/2009 | Takenaka et al. | 250/370.09 |
| 2009/0323897 A1 | 12/2009 | Kameshima et al. | 378/116 |
| 2010/0020933 A1* | 1/2010 | Topfer et al. | 378/98.11 |
| 2010/0086102 A1 | 4/2010 | Kameshima et al. | 378/62 |
| 2010/0277592 A1 | 11/2010 | Yokoyama et al. | 348/162 |
| 2011/0317054 A1 | 12/2011 | Kameshima et al. | 348/302 |

FOREIGN PATENT DOCUMENTS

| | | |
|---|---|---|
| CN | 101345815 A | 1/2009 |
| JP | 09-019424 | 1/1997 |
| JP | 11-138213 | 5/1999 |
| JP | 2003-033340 | 2/2003 |
| JP | 2006345976 A | 12/2006 |
| JP | 2008-141705 | 6/2008 |
| JP | 2008-1667846 | 7/2008 |
| WO | WO 2007/063997 | 6/2007 |

\* cited by examiner

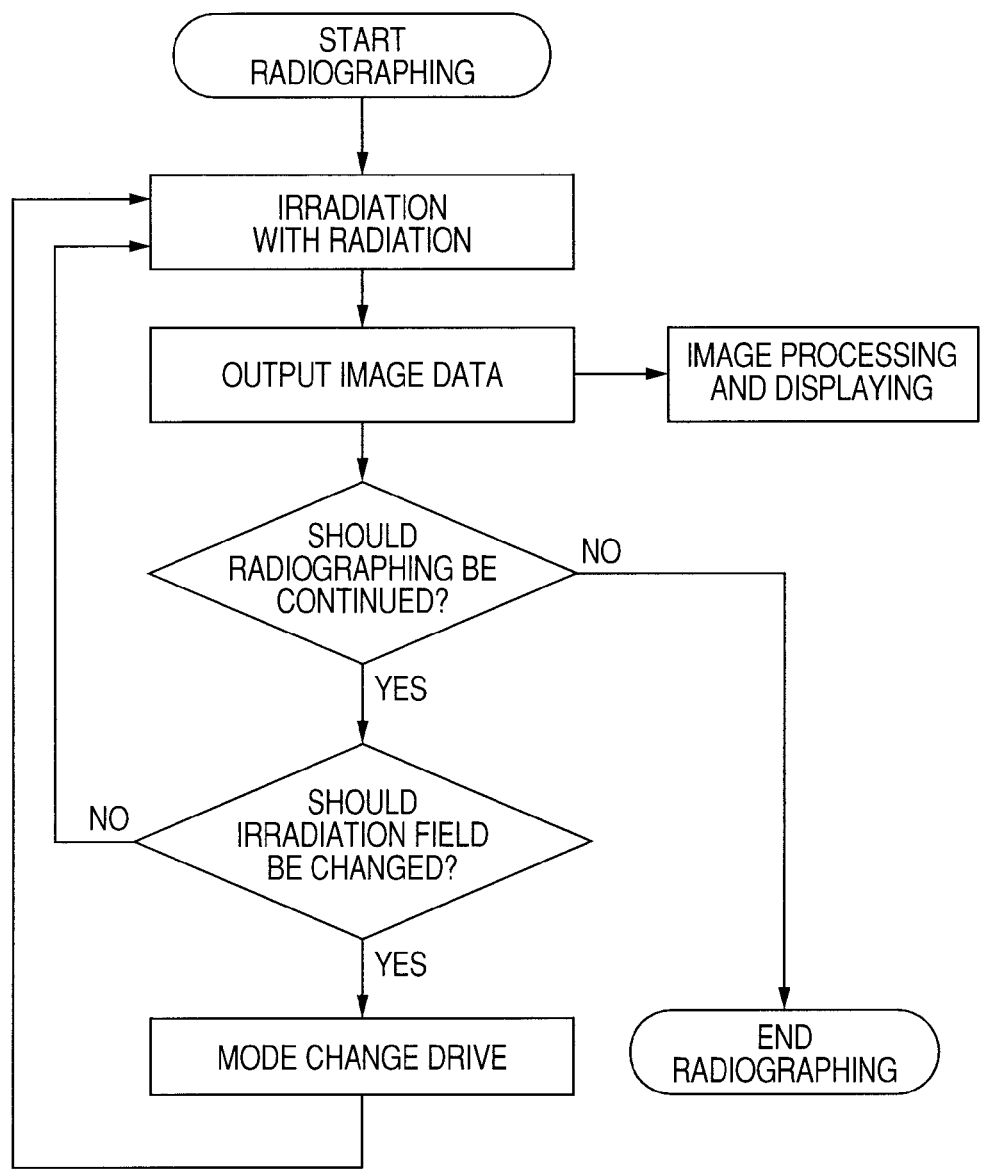

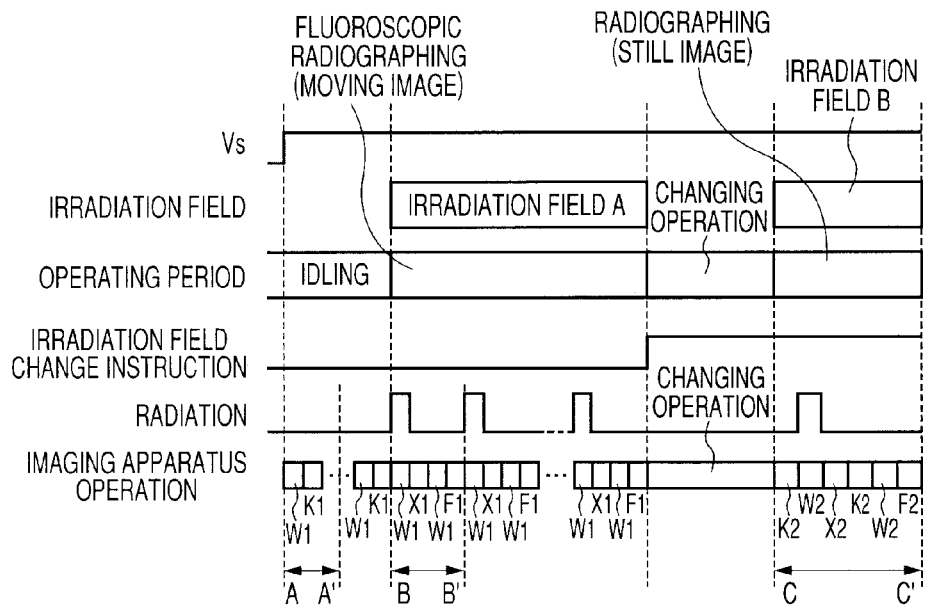
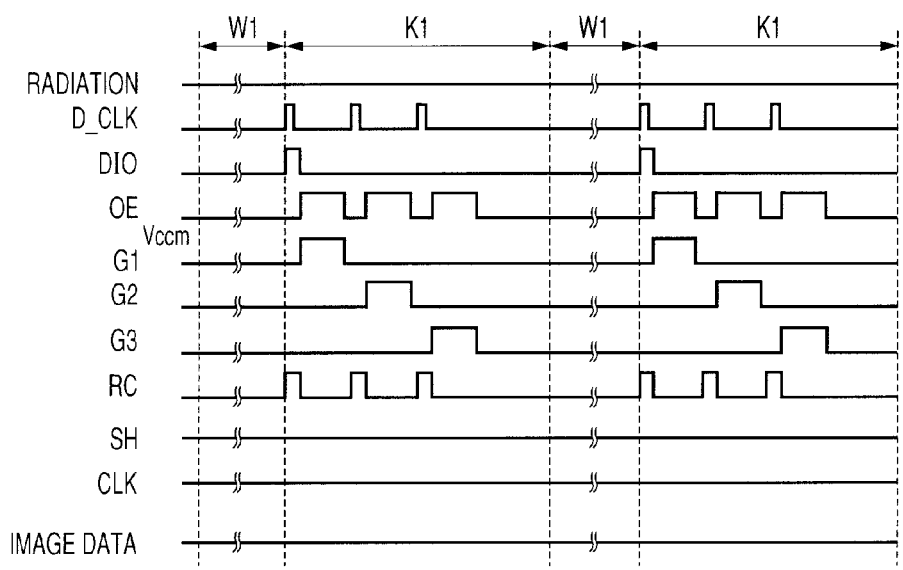

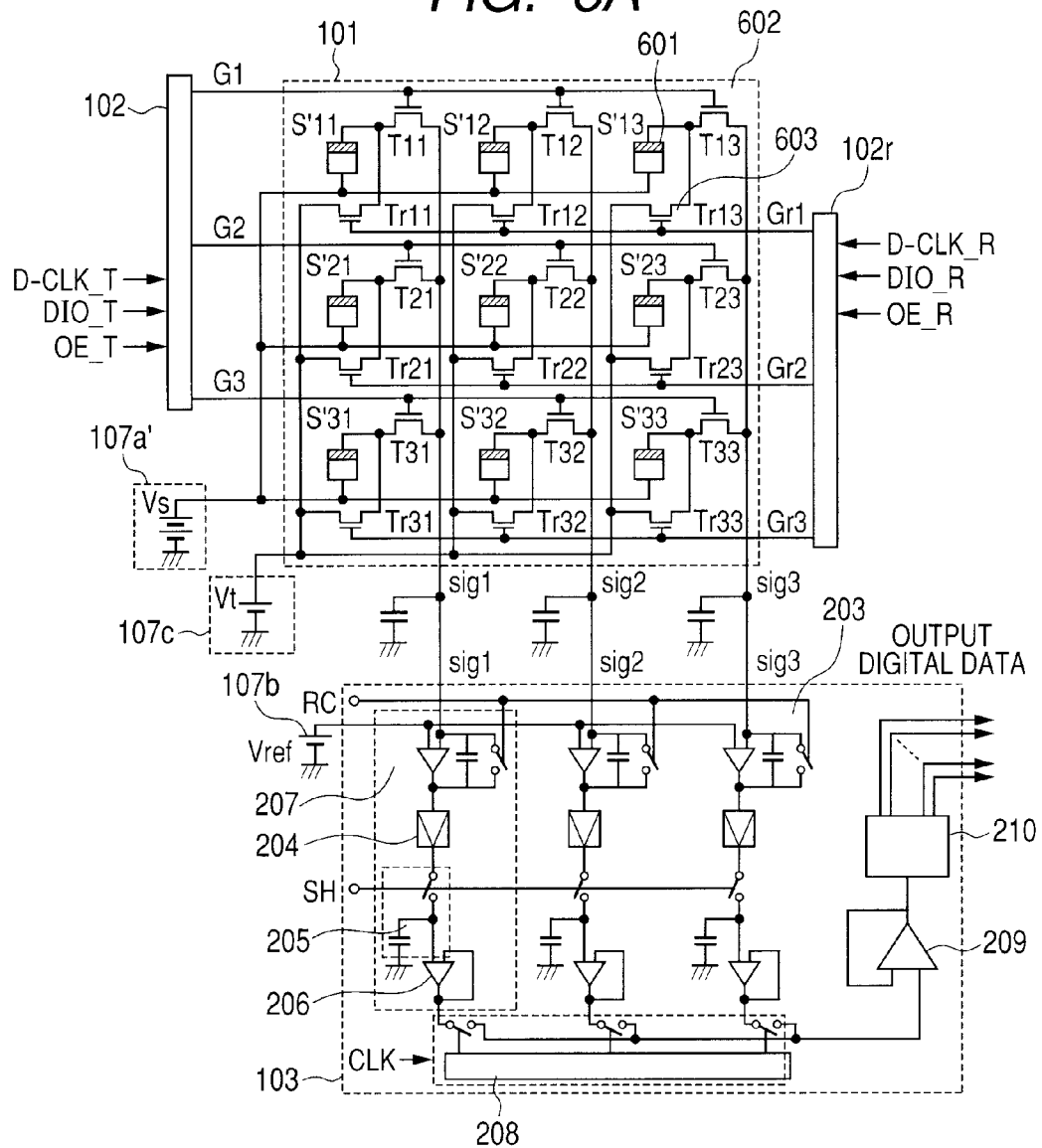
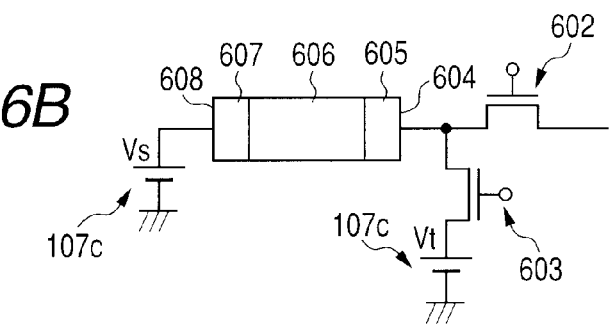
FIG. 6A
FIG. 6B

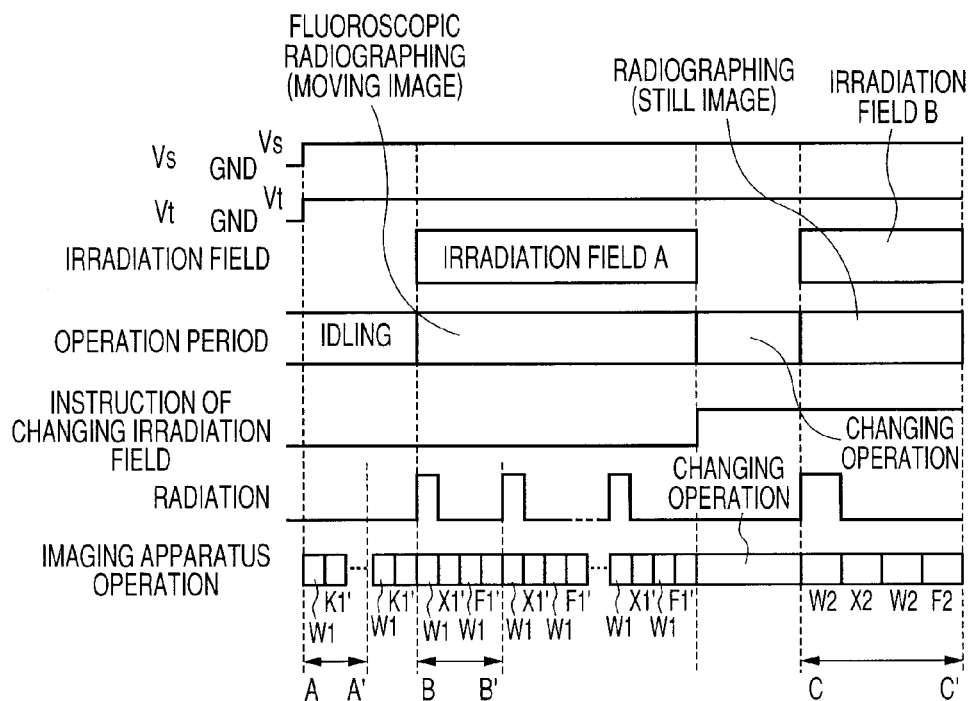
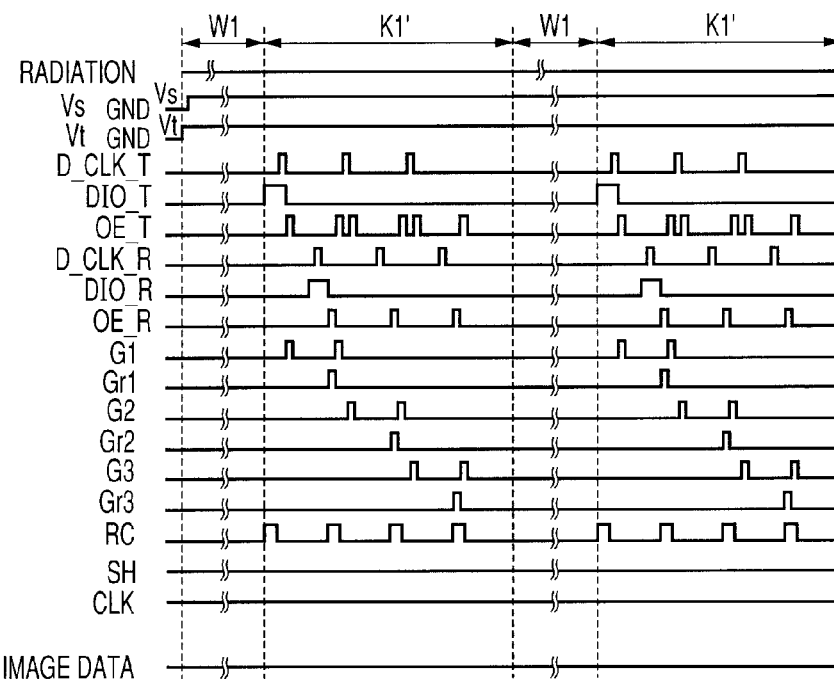

IMAGING APPARATUS AND IMAGING SYSTEM, METHOD THEREOF AND PROGRAM FOR THE SAME

TECHNICAL FIELD

The present invention relates to an imaging apparatus and an imaging system. More particularly, the present invention relates to a radiation imaging apparatus and an imaging system used for a radiation imaging system that are preferably used for still image radiographing such as radiographing and moving image radiographing such as fluoroscopic radiographing in medical diagnostics. Note that radiation, in the present invention, includes, in addition to an alpha beam, a beta beam and a gamma beam which are beams made of a particle (including a photon) emitted due to radioactive decay, a beam having energy equal to or more than those beams have, such as an X-ray, a corpuscular ray and a cosmic ray.

BACKGROUND ART

Recently, a radiation imaging apparatus using a flat panel detector (FPD) formed of semiconductor material has began to be in a practical use as an imaging apparatus used for medical image diagnostics and non-destructive inspection through an X-ray. Such a radiation imaging apparatus is used as a digital imaging apparatus for still image radiographing such as radiographing and moving image radiographing such as fluoroscopic radiographing, for example, in medical image diagnostics.

Regarding such a radiation imaging apparatus, as disclosed in Japanese Patent Application Laid-Open No. H11-128213, it is considered that an area where an FPD reads out (field size) may be switched to and from an X-ray irradiation area. However, if the irradiation area becomes wider after switching, pixel sensitivity or an dark output differs between in an area irradiated and in an area not irradiated in the FPD. Therefore, a ghost (step of image) affected by the irradiation area occurs in a provided image, which may cause image quality degradation.

Japanese Patent Application Laid-Open No. 2008-167846 considers that image processing may be carried out for correcting a ghost affected by such a changing in irradiation area. Specifically, a ghost correction factor is derived, based on data having a ghost according to uniform irradiation for each of X-ray irradiation conditions. Based on the ghost correction factor, a required ghost correction factor is derived that corresponds to an X-ray irradiation condition at collecting data about an object portion to be inspected, i.e. an irradiation area, and time from the start of X-ray irradiation. Thus, the data about the object portion to be inspected is corrected by using the required ghost correction factor to create corrected image data.

DISCLOSURE OF THE INVENTION

Technical Problem

However, the correction technique described in Japanese Patent Application Laid-Open No. 2008-167846 corrects by using image processing, so that management of parameters and correction processing are complex, resulting in a complex apparatus as a whole. Further, tasks are cumbersome because, for example, it is necessary to acquire data for correction in advance, and additionally, management for acquiring stable image quality is difficult because, for example, a method for acquiring data has to be thoroughly and accurately executed. Moreover, the correction does not reduce the amount of after image itself which causes the ghost described above and which is contained in an image signal provided by the FPD, and it, therefore, is difficult to achieve an optimal advantage in various situations.

Solution of Problem

The applicants have keenly studied to provide an imaging apparatus and an imaging system capable of reducing a step of image which may occur in a provided image and which is affected by an irradiation area, and preventing considerable image quality degradation without complex image processing, and we have thought of various aspects of the present invention to be described below.

According to an aspect, the present invention provides an imaging apparatus comprising: a detector including a plurality of pixels arranged in an array, wherein the pixel includes a conversion element for converting a radiation or a light into an electric charge, and the detector performs an imaging operation for outputting an image data according to an irradiation with the radiation or the light; and a controlling unit for controlling an operation of the detector including the imaging operation, wherein the imaging operation includes a first imaging operation for outputting an image data according to the irradiation with the radiation or the light in a first irradiation field corresponding to a part of the plurality of pixels, and a second imaging operation for outputting an image data according to the irradiation with the radiation or the light in a second irradiation field of an area larger than that of the first irradiation field, and the controlling unit controls the operation of the detector such that, responsive to a changing from the irradiation in the first irradiation field to the irradiation in the second irradiation field, the detector performs an initializing operation for initializing the conversion element during a period between the first and second imaging operations.

According to another aspect, the present invention provides an imaging system comprising: the above imaging apparatus; a radiation generator apparatus for irradiating the imaging apparatus with the radiation; and a controlling apparatus for controlling the imaging apparatus and the radiation generator apparatus, wherein the radiation generator apparatus includes a mechanism having a function of switching between the first and second irradiation fields according to a control signal received from the controlling apparatus.

According to a still another aspect, the present invention provides a controlling method of an imaging apparatus comprising: a detector including a plurality of pixels arranged in an array, wherein the pixel includes a conversion element for converting a radiation or a light into an electric charge, and the detector performs an imaging operation for outputting an image data according to an irradiation with the radiation or the light, the method controlling an operation of the detector including the imaging operation, wherein the method comprises: a first imaging operation for outputting an image data according to the irradiation with the radiation or the light in a first irradiation field corresponding to a part of the plurality of pixels of the detector; an initializing operation, following to the first imaging operation, for initializing the conversion element, responsive to an instruction for changing the irradiation in the first irradiation field to the irradiation in a second irradiation field of an area larger than that of the first irradiation field; and a second imaging operation, following to the initializing operation, for outputting an image data according to the irradiation with the radiation or the light in the second irradiation field of the detector.

According to further aspect, the present invention provides a computer program for setting a computer to execute a controlling of an imaging apparatus comprising: a detector including a plurality of pixels arranged in an array, wherein the pixel includes a conversion element for converting a radiation or a light into an electric charge, and the detector performs an imaging operation for outputting an image data according to an irradiation with the radiation or the light, such that the detector performs an operation including an imaging operation, wherein the computer program sets the detector to perform: a first imaging operation for outputting an image data according to the irradiation with the radiation or the light in a first irradiation field corresponding to a part of the plurality of pixels of the detector; an initializing operation, following to the first imaging operation, for initializing the conversion element, responsive to an instruction for changing the irradiation in the first irradiation field to the irradiation in a second irradiation field of an area larger than that of the first irradiation field; and a second imaging operation, following to the initializing operation, for outputting an image data according to the irradiation with the radiation or the light in the second irradiation field of the detector.

Advantageous Effect of Invention

The present invention has an advantageous effect capable of reducing a ghost (step of image) which may occur in an image provided by a driving operation of an FPD and which is affected by an irradiation area, and preventing considerable image quality degradation without complex image processing.

Further features of the present invention will become apparent from the following description of exemplary embodiments with reference to the attached drawings.

BRIEF DESCRIPTION OF THE DRAWINGS

FIG. 3 is a flow chart for illustrating an operation of the imaging apparatus and the imaging system according to the present invention.

FIGS. 4A, 4B, 4C and 4D are a timing chart for illustrating the operation of the imaging apparatus and the imaging system according to the present invention.

FIGS. 6A and 6B are a conceptual, equivalent circuit diagram of an imaging apparatus according to a second embodiment of the present invention.

FIGS. 7A, 7B, 7C and 7D are a timing chart for illustrating an operation of the imaging apparatus and the imaging system according to the second embodiment of the present invention.

BEST MODES FOR CARRYING OUT THE INVENTION

Now, embodiments to which the present invention is preferably applicable will be hereinafter described in detail with reference to the attached drawings.

First Embodiment

Figure 1:
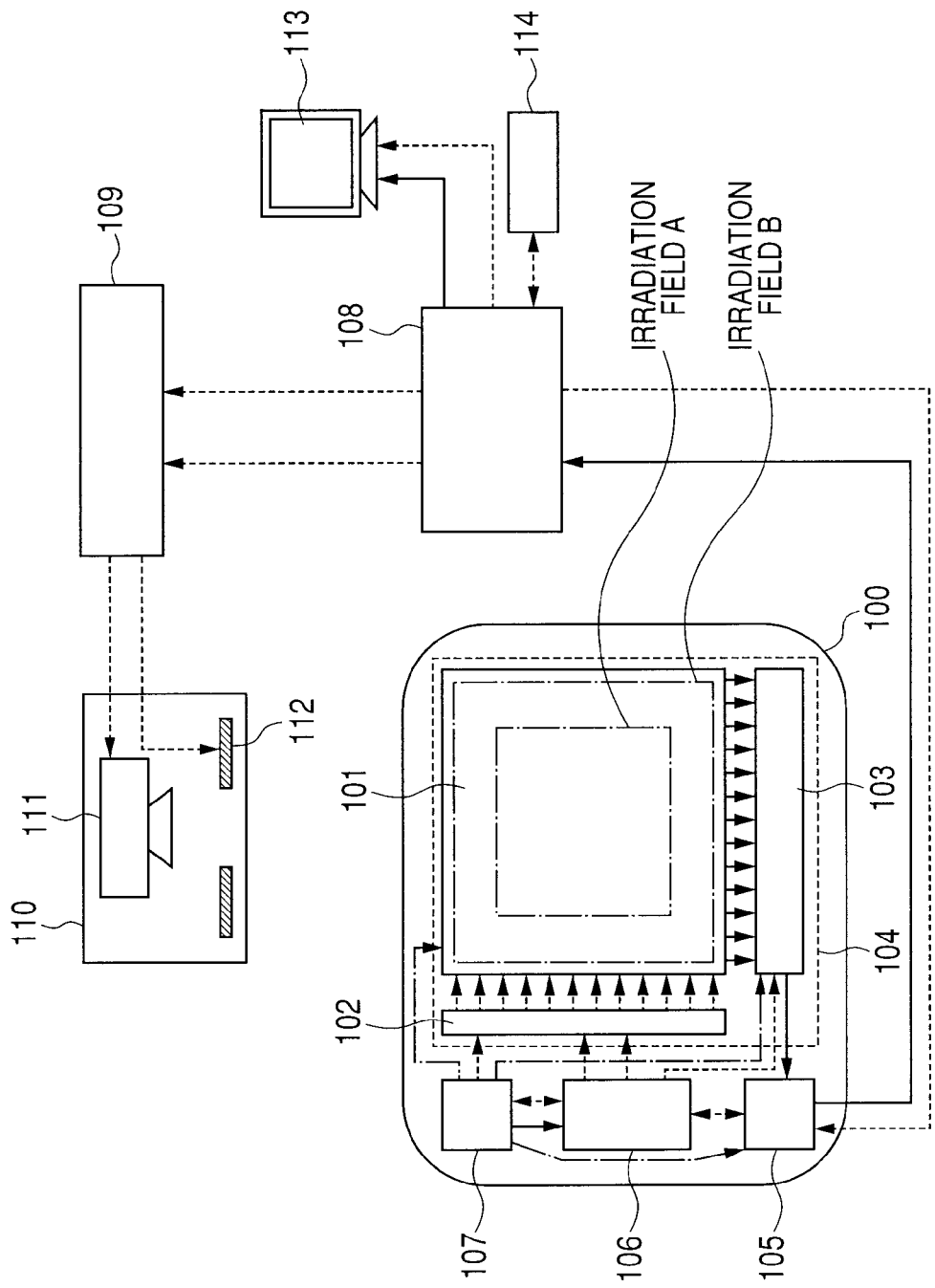
FIG. 1 is a conceptual block diagram of an imaging system including an imaging apparatus according to a first embodiment of the present invention.

A radiation imaging system illustrated in FIG. 1 according to the present embodiment includes an imaging apparatus 100, a control computer 108, a radiation controlling apparatus 109, a radiation generator apparatus 110, a display 113, and a console 114. The imaging apparatus 100 includes a flat panel detector (FPD) 104 which includes a detecting unit 101 having a plurality of pixels for converting radiation or light into an electric signal, a driving circuit 102 for driving the detecting unit 101, and a read out circuit 103 for outputting as image data the electric signal from the detecting unit 101 driven. The imaging apparatus 100 further includes a signal processing unit 105 for processing the image data from the FPD 104 to output it, a control unit 106 for supplying an individual control signal to each of components to control an operation of the FPD 104, and a power source 107 for supplying an individual bias to each of the components. The signal processing unit 105 receives a control signal from the control computer 108 and supplies it to the control unit 106, as describe below. The power source 107 has built-in power source circuits such as regulators for receiving a voltage from an external power source or a built-in battery (not shown) to supply required voltages to the detecting unit 101, the driving circuit 102 and the read out circuit 103.

The control computer 108 performs synchronization between the radiation generator apparatus 110 and the imaging apparatus 100, transmission of a control signal for determining a status of the imaging apparatus 100, and image processing for correcting, storing and displaying the image data from the imaging apparatus 100. Also, the control computer 108 transmits a control signal for determining an irradiation condition of radiation to the radiation controlling apparatus 109, based on data from the console 114.

The radiation controlling apparatus 109, upon receiving a control signal from the control computer 108, controls an irradiating operation with radiation from a radiation source 111 embedded in the radiation generator apparatus 110, and an operation of an irradiation field diaphragm 112. The irradiation field diaphragm 112 has a function that can change a predetermined irradiation field, i.e. an area where the detecting unit 101 in the FPD 104 is irradiated with radiation or light comparable to radiation, and it, in the embodiment, has a function that can switch between an irradiation field A and an irradiation field B. In the irradiation field A corresponding to a first irradiation field of the present invention, radiation is irradiated to a part of a plurality of pixels, for example, pixels of about 1000 rows and about 1000 lines when there are pixels consisting of about 2800 rows and about 2800 lines in total. Also, in the irradiation field B corresponding to a second irradiation field of the present invention, radiation is irradiated to a wider part than the irradiation field A, for example, all the pixels. The console 114 is used to input information of an object and an imaging condition, and send them to the control computer 108 as a parameter for various types of control used by the control computer 108. The display 113 displays image data that is image processed by the control computer 108.

Next, an imaging apparatus according to a first embodiment of the present invention is described with reference to FIG. 2. Note that a like component as that described above with reference to FIG. 1 is given a like reference number, and detailed description thereof is omitted. Also, FIG. 2, for the simplicity, illustrates an imaging apparatus including an FPD having pixels arrayed in 3 rows and 3 lines. However, an actual imaging apparatus may have higher order multi-pixels, and, for example, a 17-inch imaging apparatus may have pixels arrayed in about 2800 rows and about 2800 lines.

The detecting unit 101 has a plurality of pixels arranged in an array. Each of the pixels has a conversion element 201 for converting radiation or light into an electric charge, and a switching element 202 for outputting an electric signal according to the electric charge. In the embodiment, a photoelectric conversion element for converting light irradiated to the conversion element into an electric charge used is a PIN photodiode which is disposed on an insulating substrate such as a glass substrate and whose main material is amorphous silicon. The conversion element used may be preferably an indirect conversion element which includes a wavelength converter for converting radiation into light in a wavelength band that the photoelectric conversion element described above can sense, disposed on the incident side of the radiation of the photoelectric conversion element, and a direct conversion element for converting directly radiation into an electric charge. The switching element 202 used may be preferably a transistor having a control terminal and two main terminals, and in the embodiment, a thin-film transistor (TFT) is used. One electrode of the conversion element 201 is electrically connected to one of two main terminals of the switching element 202, and the other electrode is electrically connected to a bias power source 107a through a common bias wiring Bs. A plurality of switching elements in the row direction, for example, T11-T13 have their control terminals commonly and electrically connected to a driving wiring G1 in the first row, and the driving circuit 102 sends a driving signal for controlling a conducting state of each of the switching elements through the driving wiring for each of the rows. A plurality of switching elements in the line direction, for example, T11-T31 have the other of the main control terminals electrically connected to a signal wiring Sig1 in the first line, and during the conducting state of the switching elements, an electric signal according to an electric charge of each of the conversion elements is output to the read out circuit 103 through the signal wiring. A plurality of signal wirings Sig1-Sig3 arranged in the line direction carry in parallel electric signals output by the plurality of pixels to the read out circuit 103.

The read out circuit 103 includes an amplifying circuit 207 for amplifying each of the electric signals output in parallel by the detecting unit 101 for each of the signal wirings. Also, each of the amplifying circuits 207 includes an integrating amplifier 203 for amplifying the electric signal output, a variable gain amplifier 204 for amplifying the electric signal from the integrating amplifier 203, a sample and hold circuit 205 for sampling and holding the amplified electric signal, and a buffer amplifier 206. The integrating amplifier 203 includes an operational amplifier for amplifying the electric signal read out to output it, an integrating capacitor and a reset switch. The integrating amplifier 203 has a variable amplification factor according to change in integrating capacitor value. An electric signal output is input to an inverting input terminal of the operational amplifier, and a reference voltage Vref is input to a non-inverting input terminal from a reference power source 107b, and an amplified electric signal is output from an output terminal. Also, the integrating capacitor is disposed between the inverting input terminal and the output terminal. The sample and hold circuit 205 is provided corresponding to each of the amplifying circuits, and composed of a sampling switch and a sampling capacitor. Also, the read out circuit 103 includes a multiplexer 208 for sequentially outputting an electric signal read out in parallel from each of the amplifying circuits 207 as an image signal in a serial signal form, and a buffer amplifier 209 for converting impedance of the image signal to output it. The image signal Vout which is an analog electric signal output by the buffer amplifier 209 is converted into digital image data by an analog to digital converter 210, which is output to the signal processing unit 105 illustrated in FIG. 1. Then, the image data processed by the signal processing unit 105 is output to the control computer 108.

The driving circuit 102 outputs, to each of the driving wirings, a driving signal having a conducting voltage Vcom for setting each of the switching elements at a conducting state and a non-conducting voltage Vss for setting each of the switching elements at a non-conducting state, responsive to control signals (D-CLK, OE, DIO) input from the control unit 106 illustrated in FIG. 1. Accordingly, the driving circuit 102 controls the conducting state and the non-conducting state of the switching elements to drive the detecting unit 101.

Figure 2:
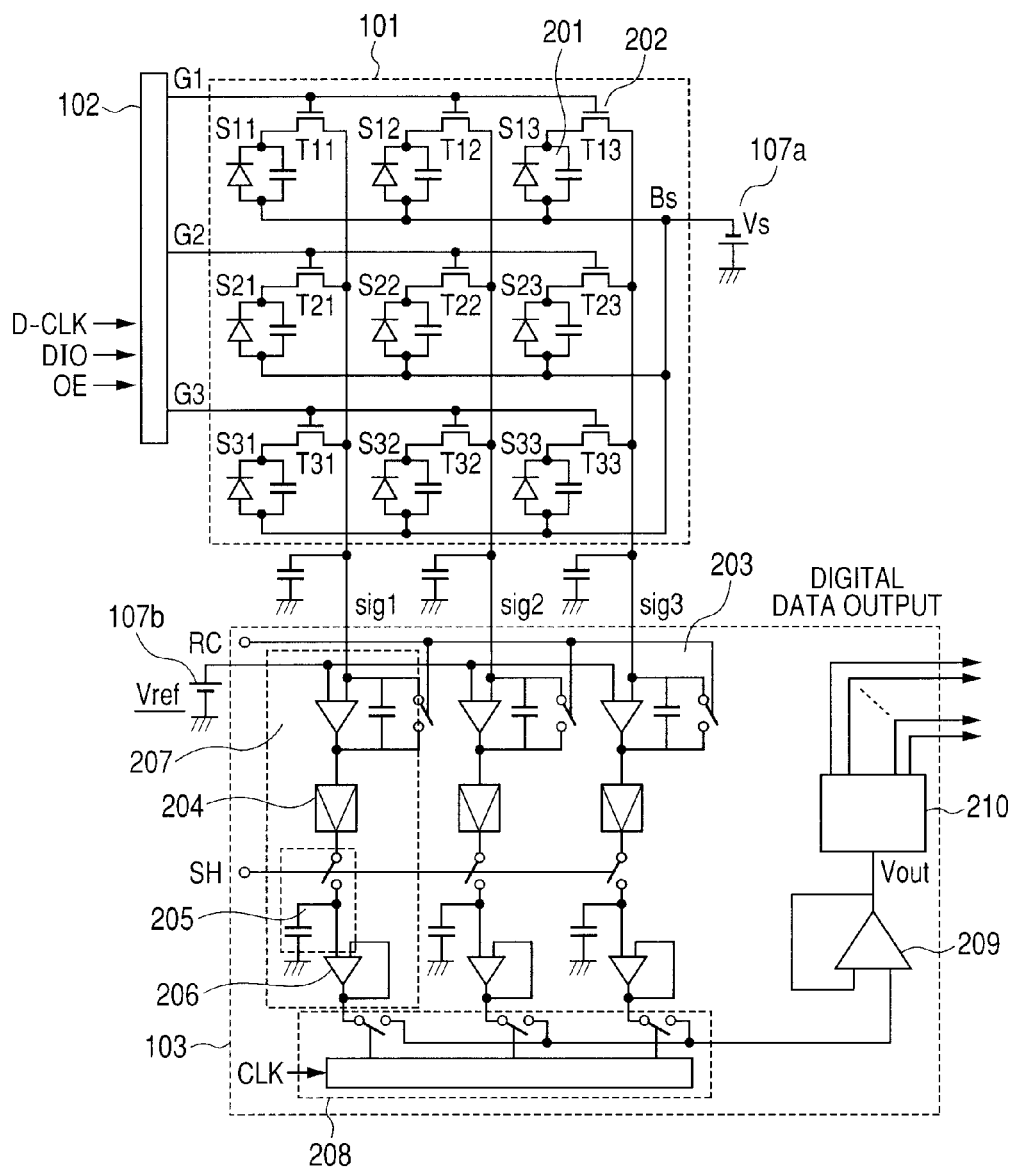
FIG. 2 is a conceptual, equivalent circuit diagram of the imaging apparatus according to the first embodiment of the present invention.

The power source 107 in FIG. 1 includes the bias power source 107a and the reference power source 107b for the amplifying circuits illustrated in FIG. 2. The bias power source 107a commonly supplies a bias voltage Vs to the other electrode of each of the conversion elements through the bias wiring Bs. This bias voltage Vs corresponds to a first voltage of the present invention. The reference power source 107b supplies the reference voltage Vref to the non-inverting input terminal of each of the operational amplifiers.

The control unit 106 illustrated in FIG. 1 receives a control signal from the external control computer 108 through the signal processing unit 105, and controls an operation of the FPD 104 by sending various types of control signals to the driving circuit 102, the power source 107 and the read out circuit 103. The control unit 106 controls an operation of the driving circuit 102 by sending the control signals D-CLK, OE and DIO to the driving circuit 102. Here, the control signal D-CLK is a shift clock signal for a shift register used as a driving circuit, and the control signal DIO is a pulse signal by which the shift register transfers, and the control signal OE controls an output terminal of the shift register. Also, the control unit 106 controls an operation of each of components in the read out circuit 103 by sending control signals RC, SH and CLK to the read out circuit 103. Here, the control signal RC controls an operation of the reset switch of each of the integrating amplifiers, and the control signal SH controls an operation of each of the sample and hold circuits 205, and the control signal CLK controls an operation of the multiplexer 208.

Next, with reference to FIGS. 1 to 3, particularly to FIG. 3, an operation of the imaging apparatus and the imaging system of the present invention as a whole is described. An operator operates the console 114 to determine irradiation conditions and start radiographing by using the control computer 108. The radiation generator apparatus 110 controlled by the radiation controlling apparatus 109 irradiates an object with a desired radiation under the irradiation conditions. The imaging apparatus 100 outputs image data according to the radiation which has passed through the object, and the image data output is image processed by the control computer 108 and displayed on the display 113.

The control computer 108, subsequently, asks the operator whether the radiographing should continue or not, and when the operator gives an instruction not to continue the radiographing (NO), the radiographing ends. When an instruction to continue the radiographing (YES) is given, the control computer 108 asks the operator whether an irradiation field should be changed or not. When the operator gives an instruction not to change the irradiation field (NO), the control computer 108 controls the radiation controlling apparatus 109 and the radiation generator apparatus 110 under the radiographing conditions previously determined, and radiation irradiation is carried out again under the same irradiation conditions. On the one hand, when the operator gives an instruction to change the irradiation field (YES), the control computer 108 determines irradiation conditions in which the irradiation field is changed, and the radiation controlling apparatus 109 controls the irradiation field diaphragm 112 in the radiation generator apparatus 110 based on the irradiation conditions, and thereby, an irradiation field after the changing is determined. Further, the control computer 108 sends a control signal to the imaging apparatus 100 by which the imaging apparatus 100 performs a changing operation described below in detail, and the imaging apparatus 100 performs the changing operation. After the changing operation is finished, the control computer 108 controls the radiation controlling apparatus 109 and the radiation generator apparatus 110 under the irradiation conditions determined, and radiation irradiation is carried out under the changed irradiation conditions to perform the next radiographing.

Figure 4C:
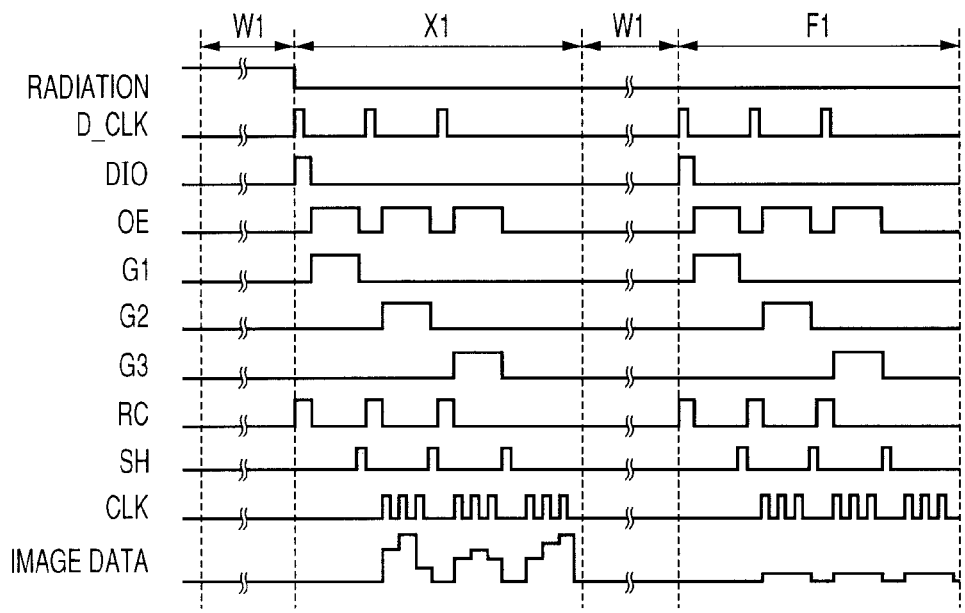

Next, with reference to FIGS. 4A to 4D, an operation of the imaging apparatus and the imaging system of the present invention is described. In FIG. 4A, once the bias voltage Vs is supplied to the conversion elements 201, the imaging apparatus 100 performs an idling operation during an idling period. Here, the term "idling operation" is an operation in that, to stabilize variation in characteristics of the detector 104 caused by the start of application of the bias voltage Vs, an initializing operation K1 is repeatedly performed for at least plural times. Further, the term "initializing operation" is an operation in which an initial bias prior to an accumulating operation is supplied to the conversion elements to initialize the conversion elements. Note that, in FIG. 4A, for the idling operation, a set of an accumulating operation W1 and the initializing operation K1 is repeatedly performed for plural times.

FIG. 4B is a timing chart for illustrating an operation of the imaging apparatus during a period A-A' in FIG. 4A. As illustrated in FIG. 4B, in the accumulating operation W1, the bias voltage Vs is applied to each of the conversion elements 201, and the non-conducting voltage Vss is applied to each of the switching elements 202, so that the switching element in each of the pixels is set at the non-conducting state. In the initializing operation K1, first, the reset switch resets the integrating capacitor in each of the integrating amplifiers and the signal wiring, and the driving circuit 102 supplies the conducting voltage Vcom to the driving wiring G1, so that the switching element T11-T13 in each of the pixels in the first row is set at the conducting state. The conducting state of the switching element causes the conversion element to be initialized. At this time, an electric charge of the conversion element is output as an electric signal through the switching element. However, in the embodiment, the circuits disposed after the sample and hold circuit are not operated, and data according to the electric signal, therefore, is not output from the read out circuit 103. Subsequently, the integrating capacitor and the signal wiring are reset again, and accordingly the electric signal output is processed. However, if it is required to use the data for correction, the circuits disposed after the sample and hold circuit may be operated in a manner similar to an image output operation and a dark image output operation described below. The control of the conducting state of the switching element and the resetting are repeatedly applied to each switching element in the second and third rows, and thereby, the initializing operation of the detecting unit 101 is performed. Here, in the initializing operation, the reset switch may be kept at the conducting state to continue resetting at least during a period of the conducting state of the switching element. Also, conducting duration of the switching element in the initializing operation may be shorter than that of the switching element in the image output operation described below. Further, in the initializing operation, the switching elements in a plurality of rows may be concurrently set at the conducting state. In such a case, it is possible to shorten a length of time for the entire initializing operation, and stabilize variation in characteristics of the detector more quickly. Note that the initializing operation K1 in the embodiment is performed during the same period as that of the image output operation contained in a fluoroscopic radiographing operation to be performed after the idling operation.

FIG. 4C is a timing chart for illustrating an operation of the imaging apparatus during a period B-B' in FIG. 4A. The idling operation is finished, and the detector 101 is in a state capable of radiographing, and subsequently, the imaging apparatus 100, upon receiving a control signal from the control computer 108, performs a fluoroscopic radiographing operation in that radiation is irradiated to the FPD 104 in the irradiation field A. This fluoroscopic radiographing operation corresponds to a first imaging operation of the present invention. Further, a period during which the imaging apparatus 100 performs this fluoroscopic radiographing operation is called "a fluoroscopic radiographing period". During the fluoroscopic radiographing period, the imaging apparatus 100 performs an accumulating operation W1 during a period corresponding to duration of the radiation irradiation in that the conversion element 201 can create an electric charge according to the radiation irradiated, and an image output operation X1 in that image data is output based on the electric charge created in the accumulating operation W1. As illustrated in FIG. 4C, in the image output operation, first, the integrating capacitor and the signal wiring are reset, and the driving circuit 102 supplies the conducting voltage Vcom to the driving wiring G1, and the switching element T11-T13 in the first row, then, is set at the conducting state. Thus, the electric signal according to the electric charge created in each of the conversion elements S11-S13 in the first row is output to each signal wiring. The electric signal output in parallel through each of the signal wirings is amplified by the operational amplifier 203 and the variable gain amplifier 204 in each of the amplifying circuits 206. Each of the amplified electric signals is held in parallel by each of the sample and hold circuit 205 driven by the control signal SH in the amplifying circuits. After holding, the integrating capacitor and the signal wiring are reset. After resetting, the conducting voltage Vcom is supplied to the driving wiring G2 in the second row similar to the first row, and each of the switching elements T21-T23 in the second row is set at the conducting state. During a period in which the switching element T21-T23 in the second row is in the conducting state, the multiplexer 208 sequentially outputs the electric signal held by each of the sample and hold circuits 205. Thus, the electric signal read out in parallel from each of the pixels in the first row is converted into an image signal in a serial signal form, which is output to and converted into image data per row by the analog to digital converter 210 to output it. The operations described above are performed to from the first to third rows for each of the rows, and thereby, image data per frame is output by the imaging apparatus. Further, the embodiment performs an accumulating operation W1 during the same period as that of the accumulating operation W1 in that the conversion element 201 can create an electric charge in a dark state in which radiation is not irradiated, and a dark image output operation F1 in that dark image data is output based on the electric charge created in the accumulating operation W1. In the dark image output operation F1, the imaging apparatus 100 performs an operation similar to the image output operation X1.

During the fluoroscopic radiographing period, when the control computer 108 sends a control signal which causes the imaging apparatus 100 to perform a changing operation, responsive to an instruction for changing the irradiation field, the imaging apparatus 100 performs the changing operation. At this time, the control unit 106, responsive to the control signal from the control computer 108, causes the FPD 104 to perform the changing operation by sending a control signal to each of the driving circuit 102 and the read out circuit 103. A period during which the FPD 104 performs the changing operation is called "a changing operation period". The changing operation is described below in details with reference to FIGS. 5A to 5E.

Figure 4D:
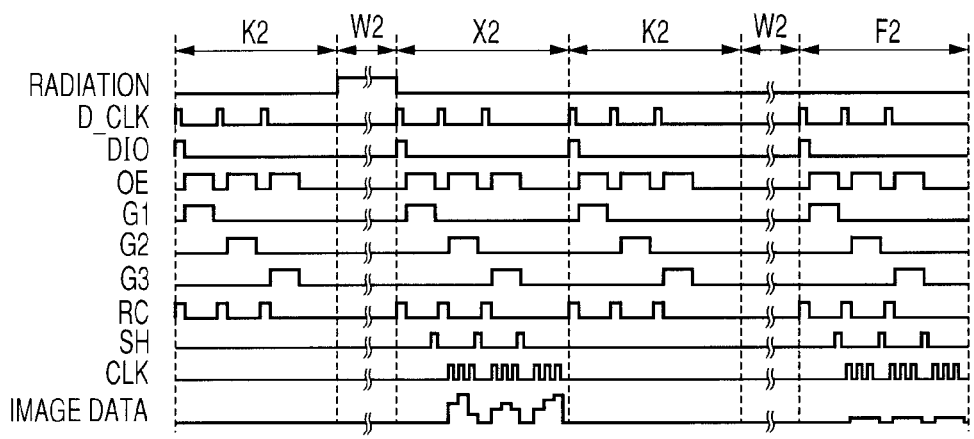

FIG. 4D is a timing chart for illustrating an operation of the imaging apparatus during a period C-C' in FIG. 4A. After the changing operation, the imaging apparatus 100 performs a radiographing operation (still image) in that radiation is irradiated to the FPD 104 in the irradiation field B wider than the irradiation field A. This radiographing operation corresponds to a second imaging operation of the present invention. Also, a period during which the imaging apparatus 100 performs the radiographing operation is called "a radiographing operation period". During the radiographing operation period, the imaging apparatus 100 performs an accumulating operation W2 during a period according to duration of radiation irradiation in that the conversion element can create an electric charge according to the radiation irradiated, and an image output operation X2 in that image data is output, based on the electric charge created in the accumulating operation W2. As illustrated in FIG. 4D, here, the accumulating operation W2 and the image output operation X2 in the embodiment are similar to the accumulating operation W1 and the image output operation X1, respectively. In the embodiment, because their periods are longer, different symbols are used. However, their periods may have similar lengths, respectively. Also, the embodiment performs an accumulating operation W2 during the same period as that of the accumulating operation W2 prior to the image output operation X2 so that the conversion element can create an electric charge in the dark state in which radiation is not irradiated, and an dark image output operation F2 in that dark image data is output, based on the electric charge created in the accumulating operation W2. In the dark image output operation F2, the imaging apparatus 100 performs an operation similar to the image output operation X2. Further, in the embodiment, the imaging apparatus 100 performs an initializing operation K2 prior to each of the accumulating operations W2. Here, the initializing operation K2 is an operation similar to the initializing operation K1 described above, and in the embodiment, its period has a longer length, and a different symbol is used. However, the period may have a similar length.

Next, with reference to FIGS. 5A to 5E, a changing operation of the embodiment is described. Note that, in FIG. 5E, the horizontal axis shows time from the start of an imaging operation performed after an irradiation field is changed. The longitudinal axis shows the quantity of step that is a difference between output data of pixels contained in the irradiation field A and output data of pixels not contained in the irradiation field A and contained in the irradiation field B. Note that, in FIG. 5E, the output data of pixels used is output data of pixels in the dark state.

Figure 5A:
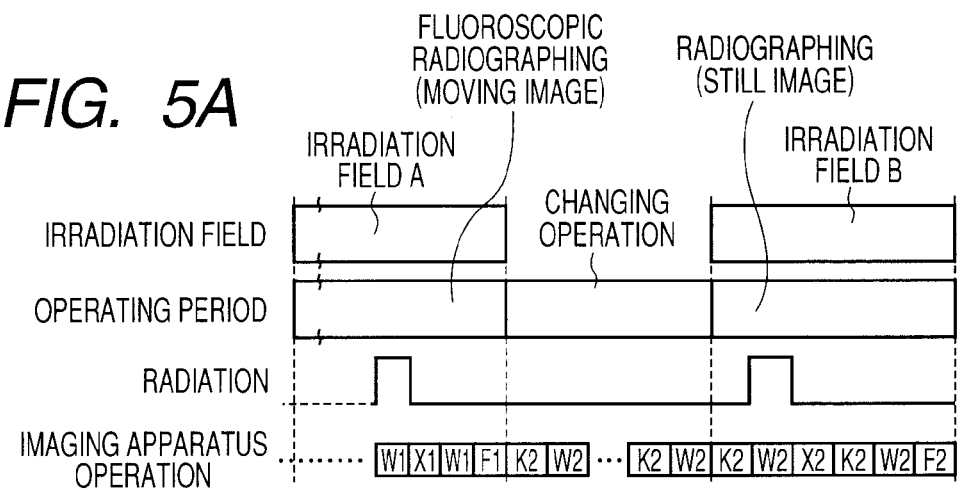
FIGS. 5A, 5B, 5C, 5D and 5E contain a timing chart for illustrating a changing operation according to the present invention, and a characteristic chart of "time vs. quantity of step" for illustrating an effect.
Figure 5B:
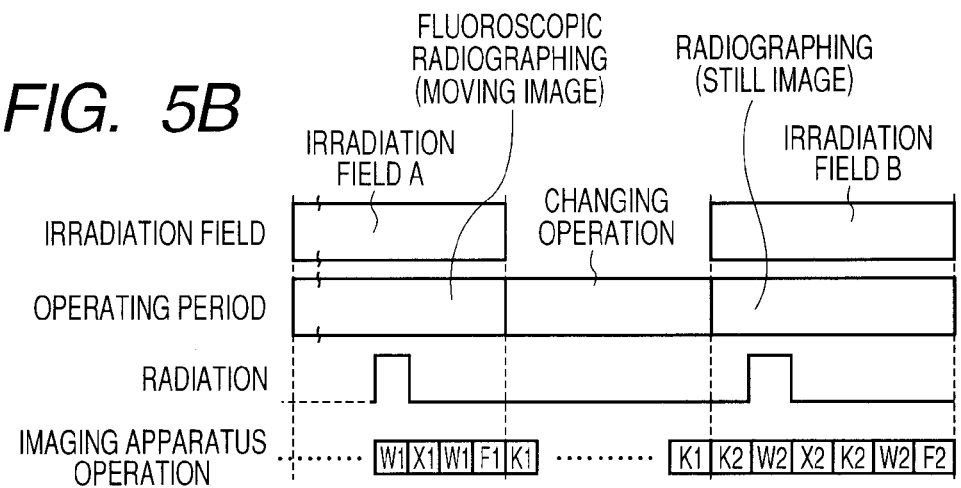

In a changing operation of the present invention, the control unit 106 receives a control signal responsive to an instruction for changing an irradiation field, and the FPD 104, responsive to the control signal, performs an initializing operation for at least one time. As illustrated in FIG. 5E, it has been found that the quantity of step is more reduced in the case where the initializing operation is performed at an irradiation field changing, compared to the case without the initializing operation. Further, it has been found that the reducing effect is improved by performing the initializing operation for plural times. Performing the initializing operation for one time or plural times in such a manner can prevent image quality degradation caused from a step of image which may occur in a provided image responsive to an irradiation field changing.

In a changing operation illustrated in FIG. 5A, the FPD 104 performs, for one time or plural times, a set of the initializing operation K2 and the accumulating operation W2 for a radiographing operation performed after an irradiation field changing as described with reference to FIGS. 4A and 4D. That is, the FPD 104 performs, for one time or plural times, a set of the initializing operation K2 and the accumulating operation W2 corresponding to the output operations X2 and F2 for a radiographing operation performed after an irradiation field changing. In such a manner, by performing the changing operation according to operations included in the operations prior to the image output operation for a radiographing operation performed after an irradiation field changing, characteristics of the conversion element during the accumulating operation W2 for a radiographing operation can be stabilized, and good image data having a small amount of artifacts can be provided. However, during a period for the accumulating operation, an electric charge is produced in the conversion element even in the dark state, which is an obstacle to stabilizing characteristics of the conversion element in a short time. Particularly when the initializing operation is performed for plural times, duration for the changing operation may be longer, and time from an irradiation field changing to the start of a radiographing may be longer.

In a changing operation illustrated in FIG. 5B, the FPD 104 performs, for one times or plural times, the initializing operation K1 for the idling operation performed prior to a fluoroscopic radiographing operation before an irradiation field changing as described with reference to FIGS. 4A and 4B. In this changing operation, the accumulating operation is not performed, and only the initializing operation K1 having the shortest length of the period among initializing operations performed by the imaging apparatus 100 is performed, so that duration necessary for the changing operation is shorter, resulting in an improved operability of the system. However, if the initializing operation performed for the changing operation does not correspond to an imaging operation after an irradiation field changing, and it is performed for a different period from that for the initializing operation performed for the imaging operation after the irradiation field changing, characteristics stability of the conversion element subjected to the accumulating operation for the imaging operation may be degraded. Accordingly, image data having a large amount of artifacts may be provided.

Figure 5C:
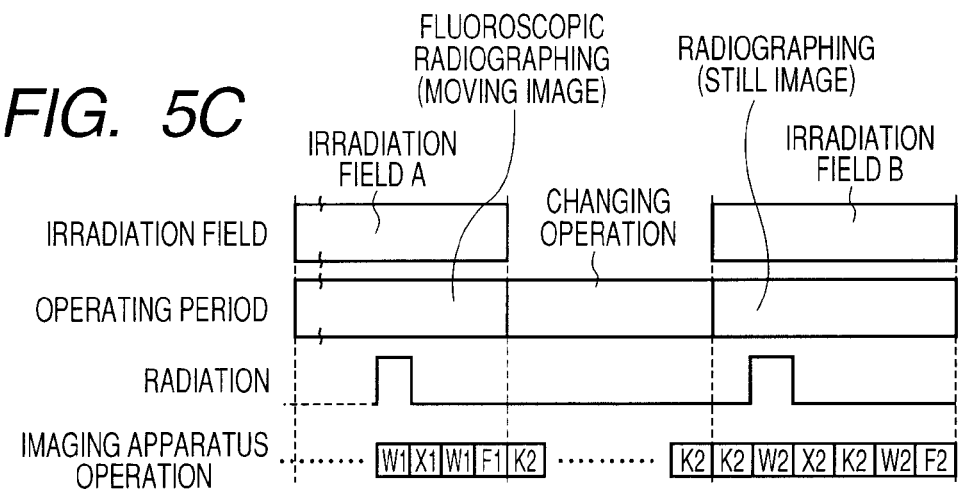
Figure 5D:
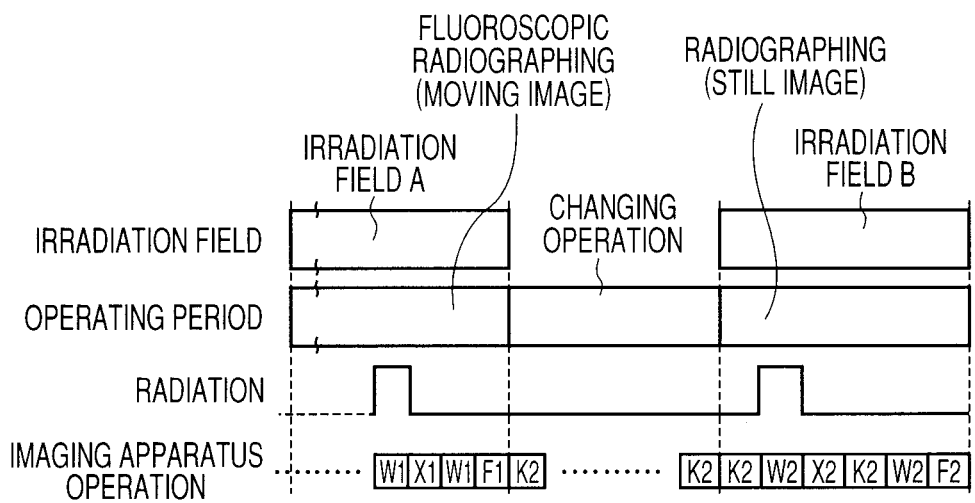
Figure 5E:
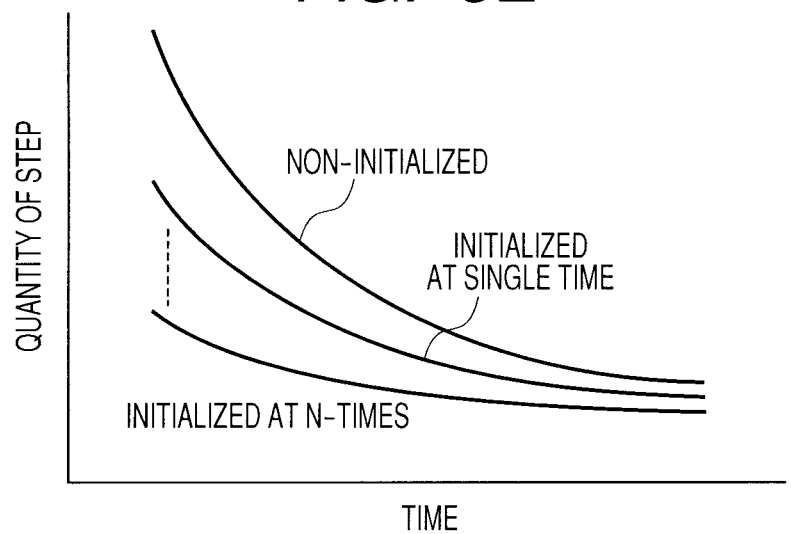

In a changing operation illustrated in FIG. 5C, the FPD 104 performs, for one times or plural times, the initializing operation K2 for a radiographing operation performed after an irradiation field changing. In this changing operation, the initializing operation included in the imaging operation performed after an irradiation field changing is used, and the initializing operation corresponding to the imaging operation after a changing is used to perform the changing operation, providing good image data having a small amount of artifacts. Further, the accumulating operation is not performed, so that characteristics of the conversion element can be stabilized in a shorter time. Particularly, for the changing operation in that the initializing operation is performed for plural times, the initializing operation for the imaging operation after a changing is preferably performed for at least one time immediately before an imaging operation performed after a changing. To stabilize characteristics of the conversion element in a shorter time, like the changing operation illustrated in FIG. 5D, the initializing operation K1 and the initializing operation K2 are more preferably performed for at least one time, respectively.

In such a manner, by performing the changing operation prior to the start of the image operation after an irradiation field changing, a ghost (step of image) which may occur in a provided image and which is affected by an irradiation area can be reduced without complex image processing, preventing considerable image quality degradation.

Second Embodiment

Next, with reference to FIGS. 6A and 6B, an imaging apparatus according to a second embodiment of the present invention will be described. Note that a like component as the first embodiment is shown by a like reference number, and detailed description thereof is omitted. Further, in FIG. 6A, similar to FIG. 2, for the simplicity, an imaging apparatus having an FPD including pixels arrayed in 3 rows and 3 lines is shown, but an actual imaging apparatus may have higher order multi-pixel.

The detecting unit 101 of the first embodiment uses a PIN photodiode as the conversion element 201, but a detecting unit 101' of the embodiment uses an MIS type photoelectric conversion element of an MIS conversion element as a conversion element 601. Also, in the first embodiment, one pixel has one switching element for outputting provided therein, but in this embodiment, one pixel has, in addition to a switching element 602 for outputting, a switching element 603 for refreshing provided therein. One of main terminals of the switching element 603 for refreshing is electrically connected to a first electrode 604 of the conversion element 601 and one of two main terminals of the switching element 602. Further, the other of the main terminals of the switching element 603 is electrically connected to a refreshment power source 107c embedded in the power source 107 through a common wiring. A plurality of switching elements 603 in the row direction have their control terminals commonly and electrically connected to a driving wiring Gr for refreshing, and a driving signal is applied to each of the switching elements 603 for refreshing for each of the rows through the driving wiring Gr for refreshing from a driving circuit 102r for refreshing.

As illustrated in FIG. 6B, the conversion element 601 has a semiconductor layer 606 between the first electrode 604 and a second electrode 608, an insulating layer 605 between the first electrode 604 and the semiconductor layer 606, and an impurity semiconductor layer between the semiconductor layer 606 and the second electrode 608 provided therein, respectively. The second electrode 608 is electrically connected to a bias power source 107a' through a bias wiring Bs. In the conversion element 601, similar to the conversion element 201, a bias voltage Vs is supplied by the bias power source 107a' to the second electrode 608, and a reference voltage Vref is supplied to the first electrode 604 through the switching element 602, and thereby, an accumulating operation is performed. Here, in a fluoroscopic radiographing operation and a radiographing operation, a refreshment voltage Vt is supplied to the first electrode 604 through the switching element 603, and the conversion element 601 is refreshed by a bias |Vs−Vt|.

Figure 7C:
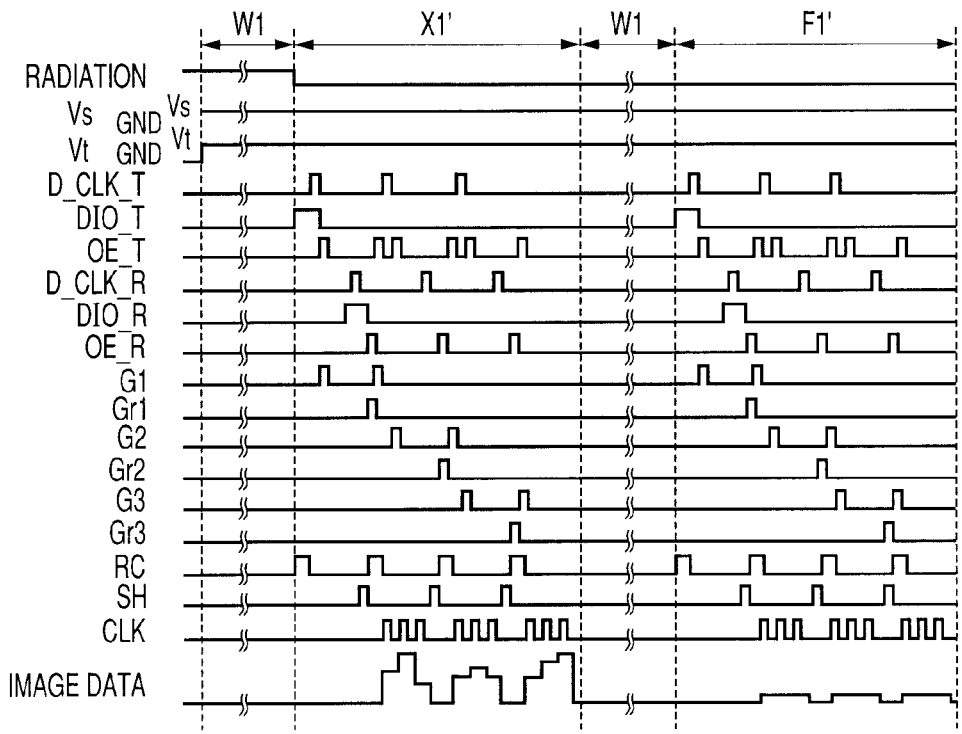
Figure 7D:
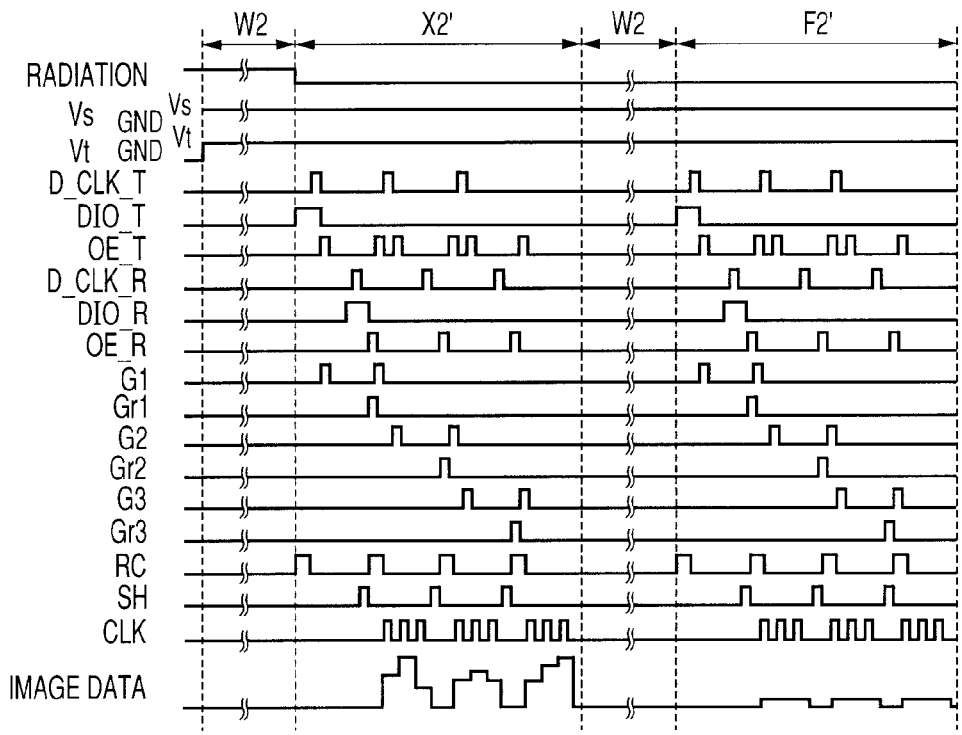

Next, with reference to FIGS. 7A to 7D, an operation of the imaging apparatus and the imaging system of the present embodiment is described. In the embodiment illustrated in FIG. 7A, instead of the initializing operation K1, the image output operation X1 and the dark image output operation F1 of the first embodiment illustrated in FIG. 4A, an initializing operation K1', an image output operation X1' and a dark image output operation F1' are performed, respectively. Further, instead of the image output operation X2 and the dark image output operation F2 of the first embodiment illustrated in FIG. 4A, an image output operation X2' and a dark image output operation F2' are performed, respectively. The other operations are similar to the first embodiment, and detailed description thereof is omitted. Different operations are described below with reference to FIGS. 7B to 7D. FIG. 7B is a timing chart for illustrating an operation of the imaging apparatus during a period A-A' in FIG. 7A. FIG. 7C is a timing chart for illustrating an operation of the imaging apparatus during a period B-B' in FIG. 7A. FIG. 7D is a timing chart for illustrating an operation of the imaging apparatus during a period C-C' in FIG. 7A.

In the embodiment, one pixel has, in addition to the switching element 602 for outputting, the switching element 603 for refreshing. Accordingly, the initializing operation K1' in an idling operation of the embodiment illustrated in FIG. 7B differs from the initializing operation K1 for which one switching element 202 per pixel operates. In the initializing operation K1', similar to the first embodiment, the conducting voltage Vcom is applied to the driving wiring G from the driving circuit 102 to set the switching element 602 at the conducting state, and an electric charge of the conversion element 601 is output as an electric signal through the switching element 602. Subsequently, the conducting voltage Vcom is applied to the driving wiring Gr by the driving circuit 102r to set the switching element 603 for refreshing at the conducting state. At this time, the refreshment voltage Vt is supplied by the refreshment power source 107c. Thus, a bias |Vs−Vt| is applied to the conversion element 601, and thereby, a residual electric charge in the conversion element is eliminated, refreshing the conversion element. The integrating capacitor and the signal wiring, then, are reset, and the switching element 602 is set at the conducting state again, and an initial bias |Vs−Vref| is applied to the conversion element, and thereby the conversion element is initialized. These operations are performed in sequence for each of the rows, resulting in achievement of the initializing operation K1'. The other operations are similar to the first embodiment, and detailed description thereof is omitted.

Further, in a fluoroscopic radiographing operation of the embodiment as illustrated in FIG. 7C, difference between the image output operation X1' and the image output operation X1, and difference between the dark image output operation F1' and the dark image output operation F1 are similar to the difference between the initializing operation K1' and the initializing operation K1 described above. The other operations are similar to the first embodiment, and detailed description thereof is omitted.

Then, in an image output operation X2' and a dark image output operation F2' for a radiographing operation in the embodiment, as illustrated in FIG. 7D, similar to the first embodiment, the conducting voltage Vcom is supplied by the driving circuit 102 to the driving wiring G to set the switching element 602 at the conducting state. Thus, an electric charge of the conversion element 601 is output as an electric signal through the switching element 602 for each of the rows, and image data is output through the read out circuit 103 from the imaging apparatus. Subsequently, the conducting voltage Vcom is supplied to the driving wiring Gr by the driving circuit 102r to set the switching element 603 for refreshing at the conducting state. At this time, the refreshment voltage Vt is supplied by the refreshment power source 107c, and thereby, a bias |Vs−Vt| is applied to the conversion element 601, and a residual electric charge in the conversion element is eliminated, refreshing the conversion element. Then, the integrating capacitor and the signal wiring are reset, and the switching element 602 is set at the conducting state again, and an initial bias |Vs−Vref| is applied to the conversion element, and thereby, the conversion element is initialized. These operations are performed in sequence for each of the rows, resulting in achievement of the image output operation X2' and the dark image output operation F2'. Further, in the embodiment, the image output operation X2' has a longer length of the period, compared to the image output operation X1', so that it is shown by a different symbol, but it may have the same length of the period.

Figure 8A:
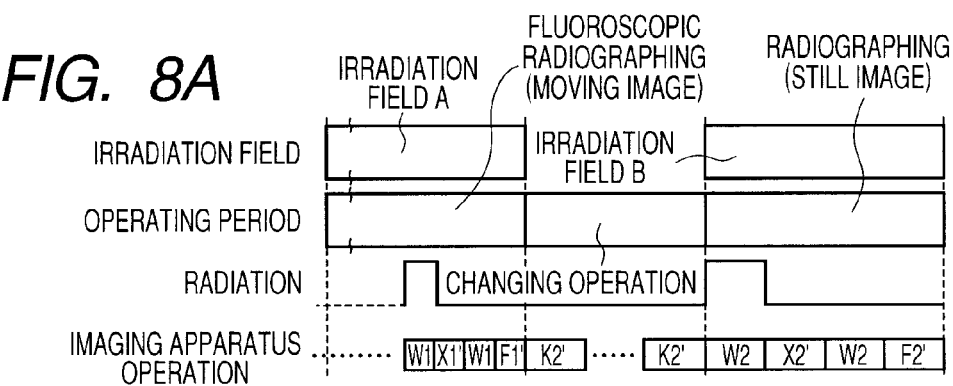
FIGS. 8A, 8B and 8C are a timing chart for illustrating a changing operation according to the second embodiment of the present invention.
Figure 8B:
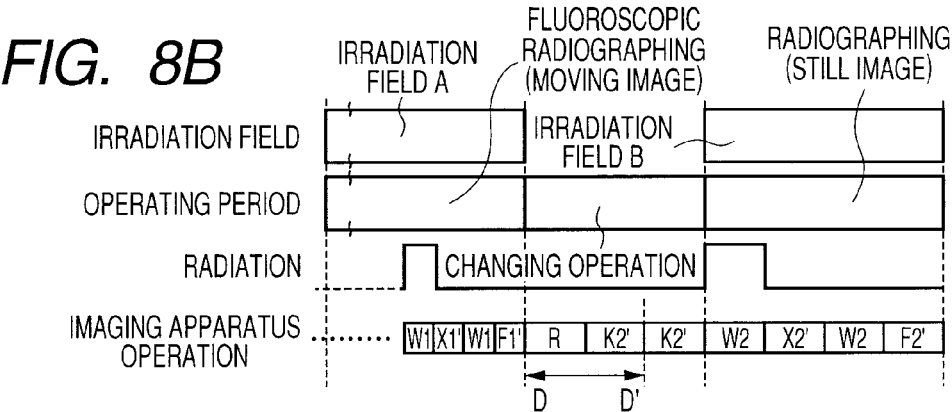
Figure 8C:
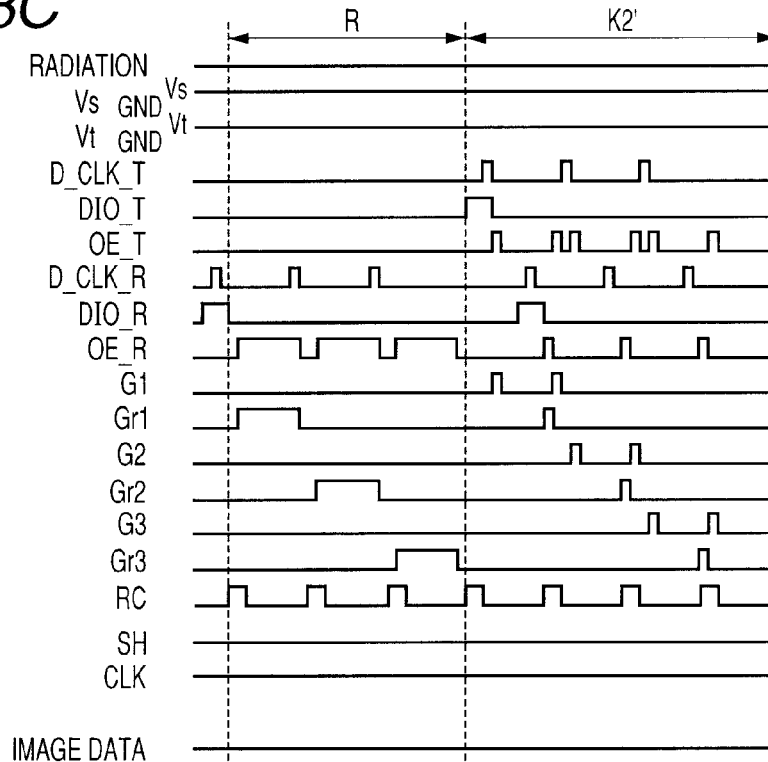

Next, with reference to FIGS. 8A to 8C, a changing operation of the embodiment is described.

In a changing operation illustrated in FIG. 8A, the FPD 104 performs, for one time or plural times, an initializing operation K2' similar to the initializing operation F1' by using the same length of the period as those of the output operations X2' and F2' for a radiographing operation. That is, the FPD 104 performs, for one time or plural times, the initializing operation K2' corresponding to the output operations X2' and F2' for a radiographing operation performed after an irradiation field changing. In this initializing operation K2', a changing operation is performed by using the initializing operation corresponding to a radiographing operation performed after an irradiation field changing, so that good image data having a small amount of artifacts can be provided. Also, the accumulating operation is not performed, and characteristics of the conversion element can be stabilized in a shorter time. Particularly, for the changing operation in that the initializing operation is performed for plural times, the initializing operation corresponding to a radiographing operation after a changing is preferably performed for at least one time immediately before a radiographing operation performed after a change.

In a changing operation illustrated in FIG. 8B, the FPD 104, first, performs, for at least one time, a refreshment operation R described below. Subsequently, the FPD 104 performs, for one time or plural times, an initializing operation K2' corresponding to the output operations X2' and F2' for a radiographing operation performed after an irradiation field changing. In this changing operation, elimination of a residual electric charge in the conversion element by the refreshment operation R, in addition to an effect of the changing operation as illustrated in FIG. 8A, allows a step of image to be more reduced. The refreshment operation is described hereinafter with reference to FIG. 8C. FIG. 8C is a timing chart for illustrating an operation of the imaging apparatus during a period D-D' in FIG. 8B.

In the refreshment operation illustrated in FIG. 8C, first, the driving circuit 102 does not supply the conducting voltage Vcom to the switching element 602, and the switching element 602 maintains the non-conducting state. In this state, the driving circuit 102r supplies the conducting voltage Vcom to the switching elements 603 per row, and the switching elements 603, accordingly, are set at the conducting state. Thus, a bias |Vs−Vt| is applied to each of the conversion elements 601, and a residual electric charge in the conversion element is eliminated, and thereby, the conversion element is refreshed. These operations are performed in sequence for each of the rows, resulting in achievement of the refreshment operation R.

After the refreshment operation R, the integrating capacitor and the signal wiring are reset, the driving circuit 102 supplies the conducting voltage Vcom to the driving wiring G to set each of the switching elements 602 at the conducting state, and an electric charge of the conversion element 601 is output as an electric signal through the switching element 602. Subsequently, the conducting voltage Vcom is applied to the driving wiring Gr by the driving circuit 102r to set the switching element 603 for refreshing at the conducting state. At this time, the refreshment voltage Vt is supplied by the refreshment power source 107c. Thus, a bias |Vs−Vt| is applied to the conversion element 601, and a residual electric charge in the conversion element is eliminated, and thereby the conversion element is refreshed again. The integrating capacitor and the signal wiring, then, are reset, and the switching element 602 is set at the conducting state again, and an initial bias |Vs−Vref| is applied to the conversion element, initializing the conversion element. These operations are performed in sequence for each of the rows, resulting in achievement of the initializing operation K2'.

Note that, also in the embodiment, the second imaging operation, similar to the first embodiment, may include the initializing operation.

Also in this embodiment, by performing the changing operation prior to the start of the image operation after an irradiation field changing, a ghost (step of image) which may occur in a provided image and which is affected by an irradiation area can be reduced without complex image processing, preventing considerable image quality degradation.

Note that each of the embodiments of the present invention can be realized, for example, by executing a program by a computer included in the control unit 106. Further, a unit for supplying the program to the computer, for example, a computer-readable recording medium for recording such program such as a CD-ROM, or a transmission medium for transmitting such program such as the Internet can apply as an embodiment of the present invention. Also, the program described above can apply as an embodiment of the present invention. The program, the recording medium and the transmission medium described above, and a program product fall within the scope of the present invention. Moreover, the scope of the present invention includes any possible combinations that may be easily thought of from the first and second embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-102039, filed Apr. 20, 2009, which is hereby incorporated by reference herein in its entirety.

The invention claimed is:

1. An imaging apparatus comprising: a detector including a plurality of pixels arranged in an array, wherein each pixel of the plurality of pixels includes a conversion element for converting radiation or light into an electric charge, and the detector performs an imaging operation for outputting an image data according to an irradiation with the radiation or the light; and a controller for controlling an operation of the detector including the imaging operation, wherein the imaging operation includes a first imaging operation for outputting an image data according to the irradiation with the radiation or the light in a first irradiation field corresponding to a part of the plurality of pixels, and a second imaging operation for outputting an image data according to the irradiation with the radiation or the light in a second irradiation field of an area larger than that of the first irradiation field, wherein the second imaging operation includes an accumulating operation in which the detector is configured to convert the radiation or the light irradiated onto the conversion element into the electric charge, an image output operation in which the detector is configured to output the image data based on the electric charge, and an operation to initialize the conversion elements, which is performed before the accumulating operation, wherein the controller controls the operation of the detector such that, responsive to a changing from the irradiation in the first irradiation field to the irradiation in the second irradiation field, the detector performs an initializing operation for initializing the conversion elements during a period between the first imaging operation and the operation to initialize the conversion elements of the second imaging operation, and wherein the controller is configured to control the detector such that the initializing operation and the operation to initialize the conversion elements of the second imaging operation are each performed for a duration having a same length.

2. The imaging apparatus according to claim 1, wherein the controller controls the operation of the detector such that the detector performs the initializing operation plural times during the period.

3. The imaging apparatus according to claim 1, wherein, during the period, the controller controls the operation of the detector such that the detector performs at least one set including (i) the initializing operation and (ii) an accumulating operation corresponding to the accumulating operation of the second imaging operation.

4. The imaging apparatus according to claim 2, wherein, during the period, the controller controls the operation of the detector such that the detector performs at a plurality of times the initializing operation, without performing an accumulating operation corresponding to the accumulating operation of the second imaging operation.

5. The imaging apparatus according to claim 1, wherein
each pixel of the plurality of pixels further includes a switching element for outputting an electric signal according to the electric charge,
the detector includes a detecting unit including the plurality of pixels arranged in the array, a driving circuit for controlling a conducting state of the switching elements to drive the detecting unit, and a read out circuit for outputting, as the image data, the electric signal from the detecting unit through a signal wiring connected to the switching elements,
the read out circuit includes a reset switch for resetting the signal wiring, and
the controller controls the driving circuit and the reset switch during the changing period between the first and second imaging operations such that the detector performs the initializing operation.

6. The imaging apparatus according to claim 1, wherein
each pixel of the plurality of pixels further includes a first switching element for outputting an electric signal according to the electric charge, and an additional switching element,
the detector includes a detecting unit including the plurality of pixels arranged in the array, a driving circuit for controlling a conducting state of the first switching elements to drive the detecting unit, a read out circuit for outputting, as the image data, the electric signal from the detecting unit through a signal wiring connected to the first switching elements, an additional driving circuit for controlling a conducting state of the additional switching elements, and
the controller controls the driving circuit and the additional driving circuit during the period such that the driving circuit controls a conducting state of the first switching elements and the additional driving circuit controls a conducting state of the additional switching elements, to set the detector to perform the initializing operation for a duration having a same length as that of the image output operation in the second imaging operation.

7. The imaging apparatus according to claim 6, wherein
the conversion elements are MIS type conversion elements,
the imaging apparatus further comprises a power source including a reference power source for supplying a reference voltage through the first switching elements to one electrode of the conversion elements, a refreshment power source for supplying a refreshment voltage through the additional switching elements to the one electrode of the conversion elements, and a bias power source for supplying a bias voltage to another electrode of the conversion elements,
the detector performs a refreshment operation for refreshing the conversion elements by setting the additional switching elements in a conducting state, by supplying the bias voltage to the another electrode of the conversion elements, and by supplying the refreshment voltage through the additional switching elements to the one electrode of the conversion elements, and
the controller controls the detector such that the detector performs, during the period, the refreshment operation, and the initializing operation after the refreshment operation.

8. An imaging apparatus according to claim 1, wherein the imaging apparatus is incorporated in an imaging system that includes:
a radiation generator apparatus for irradiating the imaging apparatus with the radiation; and
a controlling apparatus for controlling the imaging apparatus and the radiation generator apparatus,
wherein the radiation generator apparatus includes a mechanism having a function of switching between the first and second irradiation fields according to a control signal received from the controlling apparatus.

9. A controlling method of an imaging apparatus that includes a detector including a plurality of pixels arranged in an array, wherein each pixel of the plurality of pixels includes a conversion element for converting radiation or light into an electric charge, and wherein the detector performs an imaging operation for outputting image data according to an irradiation with the radiation or the light, the method controlling an operation of the detector including the imaging operation, the method comprising: a first imaging operation of outputting image data according to the irradiation with the radiation or the light in a first irradiation field corresponding to a part of the plurality of pixels of the detector; an initializing operation for initializing the conversion elements, following the first imaging operation, responsive to an instruction for changing the irradiation in the first irradiation field to the irradiation in a second irradiation field of an area larger than that of the first irradiation field; and a second imaging operation for outputting an image data according to the irradiation with the radiation or the light in the second irradiation field of the detector, following the initializing operation, wherein the second imaging operation includes an accumulating operation for converting the radiation or the light irradiated onto the conversion element into the electric charge, an image output operation for outputting the image data based on the electric charge, and an operation to initialize the conversion elements, which is performed before the accumulating operation, wherein the detector is controlled such that the initializing operation and the operation to initialize the conversion elements of the second imaging operation are each performed for a duration having a same length.

10. A non-transitory computer-readable storage medium storing, in executable form, a computer program for causing a computer to execute a controlling of an imaging apparatus that includes a detector including a plurality of pixels arranged in an array, wherein each pixel of the plurality of pixels includes a conversion element for converting radiation or light into an electric charge, and wherein the detector performs an imaging operation for outputting image data according to an irradiation with the radiation or the light, such that the detector performs an operation including an imaging operation, wherein the computer program causes the detector to perform: a first imaging operation of outputting an image data according to the irradiation with the radiation or the light in a first irradiation field corresponding to a part of the plurality of pixels of the detector; an initializing operation for initializing the conversion elements, following the first imaging operation, responsive to an instruction for changing the irradiation in the first irradiation field to the irradiation in a second irradiation field of an area larger than that of the first irradiation field; and a second imaging operation for outputting an image data according to the irradiation with the radiation or the light in the second irradiation field of the detector, following the initializing operation, wherein the second imaging operation includes an accumulating operation for converting the radiation or the light irradiated onto the conversion element into the electric charge, an image output operation for outputting the image data based on the electric charge, and an operation to initialize the conversion elements, which is performed before the accumulating operation, and wherein the detector is controlled such that the initializing operation and the operation to initialize the conversion elements of the second imaging operation are each performed for a duration having a same length.

* * * * *